United States Patent
Tsai et al.

(10) Patent No.: US 11,042,983 B1
(45) Date of Patent: Jun. 22, 2021

(54) AUTOMATIC BRAIN INFARCTION DETECTION SYSTEM ON MAGNETIC RESONANCE IMAGING AND OPERATION METHOD THEREOF

(71) Applicants: National Central University, Taoyuan (TW); Huan-Cheng Chang, Taoyuan (TW); Taipei Medical University (TMU), Taipei (TW)

(72) Inventors: Jang-Zern Tsai, Taoyuan (TW); Syu-Jyun Peng, Hsinchu County (TW); Yu-Wei Chen, Taoyuan (TW); Meng-Zong Tsai, Taoyuan (TW); Kuo-Wei Wang, Taoyuan (TW); Yeh-Lin Kuo, Kaohsiung (TW)

(73) Assignees: National Central University, Taoyuan (TW); Huan-Cheng Chang, Taoyuan (TW); Taipei Medical University (TMU), Taipei (TW)

( * ) Notice: Subject to any disclaimer, the term of this patent is extended or adjusted under 35 U.S.C. 154(b) by 0 days.

(21) Appl. No.: 16/884,070

(22) Filed: May 27, 2020

(30) Foreign Application Priority Data

Apr. 9, 2020 (TW) .................................. 109112042

(51) Int. Cl.
*G06K 9/00* (2006.01)
*G06T 7/00* (2017.01)
*G06T 5/00* (2006.01)

(52) U.S. Cl.
CPC ............ *G06T 7/0016* (2013.01); *G06T 5/009* (2013.01); *G06T 2207/10088* (2013.01); *G06T 2207/20084* (2013.01); *G06T 2207/30016* (2013.01)

(58) Field of Classification Search
None
See application file for complete search history.

(56) References Cited

U.S. PATENT DOCUMENTS

| 4,961,425 | A | * | 10/1990 | Kennedy ................ A61B 5/055 600/425 |
| 9,466,105 | B2 | | 10/2016 | Peng et al. |

(Continued)

FOREIGN PATENT DOCUMENTS

| CN | 103565440 A | 2/2014 |
| JP | 2009-20049 A | 1/2009 |

(Continued)

OTHER PUBLICATIONS

Jang-Zern Tsai et al., "Automatic Detection and Quantification of Acute Cerebral Infarct by Fuzzy Clustering and Histographic Characterization on Diffusion Weighted MR Imaging and Apparent Diffusion Coefficient Map," BioMed Research International, 2014, 1-13, (2014).

(Continued)

*Primary Examiner* — Atiba O Fitzpatrick
(74) *Attorney, Agent, or Firm* — CKC & Partners Co., LLC

(57) ABSTRACT

The present disclosure provides an operating method of an automatic brain infarction detection system on magnetic resonance imaging (MRI), which includes steps as follows. Images corresponding to different slices of a brain of a subject are received from the MRI machine. The image mask process is performed on first and second images of the images. It is determined whether the cerebellum image intensity and the brain image intensity in the first image are matched. When the cerebellum image intensity and the brain image intensity are not matched, the cerebellar image intensity in the first image is adjusted. The first image is processed through a nonlinear regression to obtain a third image. A neural network identify an infarct region by using the first, second and third images that are cut.

10 Claims, 2 Drawing Sheets

(56) References Cited

U.S. PATENT DOCUMENTS 10,163,040 B2 12/2018 Poole et al.
2021/0098127 A1* 4/2021 Kalafut ................ G06T 7/0012

FOREIGN PATENT DOCUMENTS

| TW | 201408262 A | 3/2014 |
| TW | I478697 B | 4/2015 |
| TW | I536969 B | 6/2016 |
| TW | I542328 B | 7/2016 |
| TW | I651688 B | 2/2019 |
| WO | 2012/067152 A1 | 5/2012 |

OTHER PUBLICATIONS

Jang-Zern Tsai et al., "Automated Segmentation and Quantification of White Matter Hyperintensities in Acute Ischemic Stroke Patients with Cerebral Infarction," PLoS ONE, vol. 9, Issue 8, Aug. 2014.
Liang Chen et al., "Fully automatic acute ischemic lesion segmentation in DWI using convolutional neural networks," NeuroImage: Clinical, 15, 633-643, (2017).
Mohsen Ghafoorian et al., "Location Sensitive Deep Convolutional Neural Networks for Segmentation of White Matter Hyperintensities," Scientific Reports, 7(1), Jul. 11, 2017.

\* cited by examiner

AUTOMATIC BRAIN INFARCTION DETECTION SYSTEM ON MAGNETIC RESONANCE IMAGING AND OPERATION METHOD THEREOF

RELATED APPLICATIONS

This application claims priority to Taiwan Patent Application No. 109112042, filed Apr. 9, 2020, the entirety of which is herein incorporated by reference.

BACKGROUND

Field of Invention

The present invention relates to systems and methods, and more particularly, automatic brain infarction detection systems on magnetic resonance imaging (MRI) and operating methods thereof.

Description of Related Art

After cerebral infarction, the energy metabolism of brain tissue is destroyed, and a large amount of extracellular water enters the cell. Thus, intracellular water molecules are increased, and extracellular water molecules are decreased, thereby resulting in limited diffusion. However, the amount of water in the ischemic area does not change, and only the water content inside and outside the cell changes, which limits the diffusion. Therefore, conventional MRI examinations, such as T1, T2, FLAIR, and so on, often fail to detection.

In view of above, there is an urgent need in the related field to provide an automatic brain infarction detection system and an operating method thereof.

SUMMARY

In one or more various aspects, the present disclosure is directed to automatic brain infarction detection systems on magnetic resonance imaging (MRI) and operating methods thereof.

An embodiment of the present disclosure is related to an automatic brain infarction detection system on magnetic resonance imaging (MRI). The automatic brain infarction detection system includes a memory circuit and a processor. The memory circuit is configured to store at least one instruction. The processor is coupled to the memory circuit, and the processor configured to access and execute the at least one instruction for: receiving a plurality of images corresponding to different slices of a brain of a subject from a MRI machine; performing an image mask process on a first image and a second image of the plurality of images; determining whether a cerebellum image intensity and a brain image intensity in the first image are matched; adjusting the cerebellum image intensity in the first image when the cerebellum image intensity and the brain image intensity are not matched; processing the first image through a nonlinear regression to obtain a third image; and utilizing a neural network to identify an infarct region by using the first, second and third images that are cut.

In one embodiment of the present disclosure, the first image is a diffusion-weighted image (DWI), and the second image is an apparent diffusion coefficient (ADC) map.

In one embodiment of the present disclosure, the plurality of images further includes a T1-weighted (T1w) image, the processor moves a position of the brain in the T1-weighted image to a center of the T1-weighted image based on an outline of the brain in the T1-weighted image, and then binarizes the T1-weighted image to find a most symmetrical rotation angle of the position of the brain in the T1-weighted image, so as to orientate the T1-weighted image, so that the T1-weighted image is positioned.

In one embodiment of the present disclosure, the processor uses the T1-weighted image that has been positioned as a basis of image registration for moving and orientating the DWI and the ADC map that have been binarized.

In one embodiment of the present disclosure, the image mask process filters out non-brain tissue from the DWI and the ADC map after the image registration.

Another embodiment of the present disclosure is related to an operation method of an automatic brain infarction detection system on MRI. The operation method includes steps of: receiving a plurality of images corresponding to different slices of a brain of a subject from a MRI machine; performing an image mask process on a first image and a second image of the plurality of images; determining whether a cerebellum image intensity and a brain image intensity in the first image are matched; adjusting the cerebellum image intensity in the first image when the cerebellum image intensity and the brain image intensity are not matched; processing the first image through a nonlinear regression to obtain a third image; and utilizing a neural network to identify an infarct region by using the first, second and third images that are cut.

In one embodiment of the present disclosure, the first image is a DWI, and the second image is an ADC map.

In one embodiment of the present disclosure, the plurality of images further comprises a T1-weighted image, and the operating method further includes: moving a position of the brain in the T1-weighted image to a center of the T1-weighted image based on an outline of the brain in the T1-weighted image, and then binarizing the T1-weighted image to find a most symmetrical rotation angle of the position of the brain in the T1-weighted image, so as to orientate the T1-weighted image, so that the T1-weighted image is positioned.

In one embodiment of the present disclosure, the operating method further includes: using the T1-weighted image that has been positioned as a basis of image registration for moving and orientating the DWI and the ADC map that have been binarized.

In one embodiment of the present disclosure, the image mask process filters out non-brain tissue from the DWI and the ADC map after the image registration.

Technical advantages are generally achieved, by embodiments of the present disclosure. With the technical solution of the present disclosure, the location of the lesion on the MRI can be accurately detected, so that clinicians can efficiently quantify the diagnosis of the MRI in the clinic.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
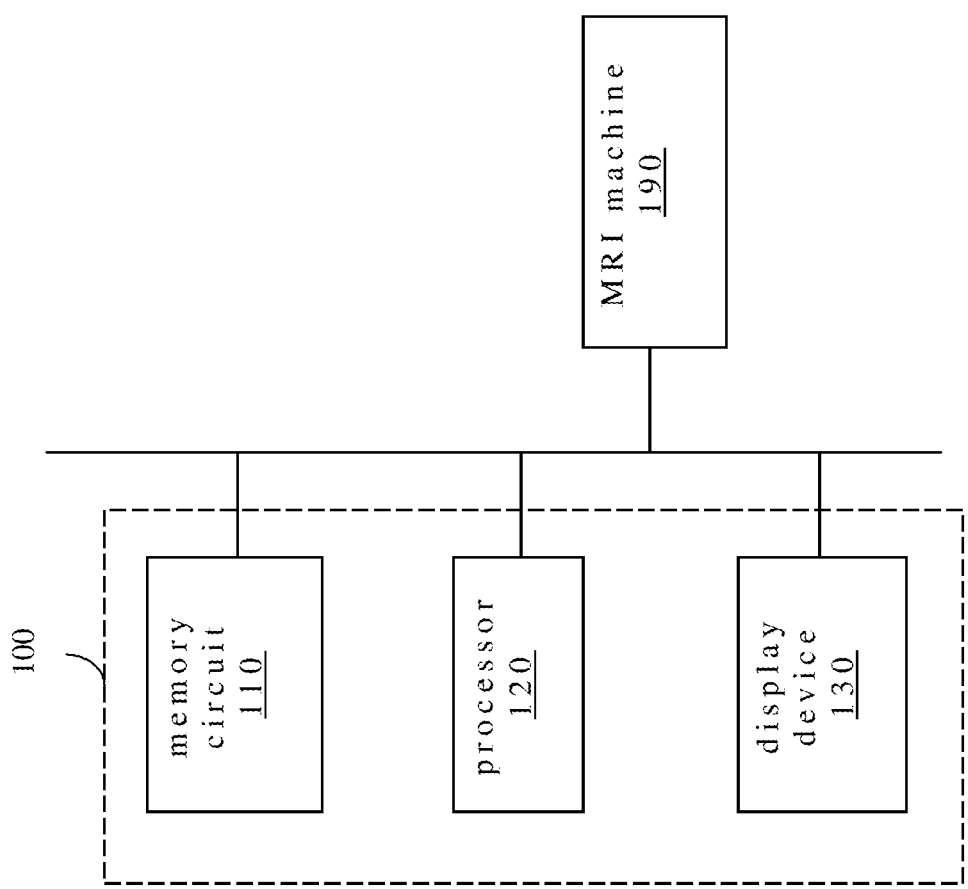
FIG. 1 is a block diagram of an automatic brain infarction detection system on MRI according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an automatic brain infarction detection system 100 on MRI according to one embodiment of the present disclosure. As shown in FIG. 1, the automatic brain infarction detection system 100 includes a memory circuit 110, a processor 120 and a display device 130. For example, the memory circuit 110 can be a hard drive, a flash memory or another storage device, the processor 120 can be a central processing unit, and a display device 130 can be a built-in the display screen or an external screen.

In structure, the automatic brain infarction detection system 100 is coupled to a MRI machine 190, and the processor 120 is coupled to the memory circuit 110 and the display device 130.

In use, the memory circuit 110 store at least one instruction, the processor 120 is coupled to the memory circuit 110, and the processor 120 accesses and executes the at least one instruction for: receiving a plurality of images corresponding to different slices of a brain of a subject from the MRI machine 190; performing an image mask process on a first image and a second image of the plurality of images; determining whether a cerebellum image intensity (e.g., the average intensity of a cerebellar image) and a brain image intensity (e.g., the average intensity of a brain image) in the first image are matched; when the cerebellum image intensity and the brain image intensity are not matched, adjusting the cerebellum image intensity in the first image; processing the first image through a nonlinear regression to obtain a third image; and utilizing a neural network to identify an infarct region by using the first, second and third images that are cut.

In one embodiment of the present disclosure, the first image is a diffusion-weighted image (DWI), and the second image is an apparent diffusion coefficient (ADC) map. It should be noted that after cerebral infarction, the energy metabolism of brain tissue is destroyed, and a large amount of extracellular water enters the cell. Thus, intracellular water molecules are increased, and extracellular water molecules are decreased, thereby resulting in limited diffusion. However, the amount of water in the ischemic area does not change, and only the water content inside and outside the cell changes, which limits the diffusion. Therefore, conventional MRI examinations, such as T1, T2, FLAIR, and so on, often fail to detection. Accordingly, the automatic brain infarction detection system 100 on MRI uses the DWI and ADC map with the most obvious infarction.

In one embodiment of the present disclosure, the plurality of images further comprises a T1-weighted image. The present disclosure uses T1-weighted image because the outline of the brain is clear, and the clear outline of the brain can be used for positioning, and thus the brain is placed in a fixed position in the image. In practice, the artifacts and infarction mainly on the image histogram have a large overlap, In addition, the image intensity of each patient does not have a fixed value, and the shape cannot be clearly distinguished. Therefore, the conventional method cannot directly separate the infarction and artifacts, and thus it is difficult for identification. Accordingly, the present disclosure is based on the position in the image to improve the judgment basis of the neural network.

Specifically, the processor 120 moves a position of the brain in the T1-weighted image to a center of the T1-weighted image based on an outline of the brain in the T1-weighted image, and then binarizes the T1-weighted image to find a most symmetrical rotation angle of the position of the brain in the T1-weighted image, so as to orientate the T1-weighted image, so that the T1-weighted image is positioned.

For example, the processor 120 is based on 50% of the histogram of T1-weighted image as a binarized threshold value. If the value is greater than this threshold value, it serves as 1. If the value is less than this threshold value, it serves as 0. In practice, the middle of a group of T1-weighted image can be selected as the basis of position. In the selected T1-weighted image, the cavity in the brain is filled by morphology dilation operation, and the size and contour of the brain are restored by morphology erosion operation. For example, the size of 5×5 is used as the size of dilation; the size of 5×5 is used as the size of erosion.

Since the human brain is symmetrical, it is necessary to find the symmetrical midline, which is the optimal rotation. The processor 120 rotates the T1-weighted image from −45 degrees to 45 degrees and shifts the 45 voxel points along each of X and Y axes. In each of above rotations or shifts, the image is divided into two halves, and the two halves are multiplied together, so as to find the maximum value of multiplication that corresponds to the optimal rotation. After the optimal rotation, the entire brain is positioned in the center of the image.

Then, the processor 120 uses the T1-weighted image that has been positioned as a basis of image registration for moving and orientating the DWI and the ADC map that have been binarized.

For example, the processor 120 is based on 60% of the histogram of DWI as a binarized threshold value. If the value is greater than this threshold value, it serves as 1. If the value is less than this threshold value, it serves as 0. In practice, the middle of a group of DWIs can be selected as the basis of position. In the selected DWI, the cavity in the brain is filled by morphology dilation operation, and the size and contour of the brain are restored by morphology erosion operation. For example, the size of 11×11 is used as the size of dilation; the size of 11×11 is used as the size of erosion.

The processor 120 takes the T1-weighted image as the target, rotates the DWI from −45 degrees to 45 degrees, and shifts the 45 voxel points along each of X and Y axes. In each of above rotations or shifts, the DWI is multiplied by the T1-weighted image, so as to find the maximum value of multiplication, so that the image registration of the DWI can be finished.

Since the ADC map is the post-production of the DWI, so that the processor 120 is based on the rotation angle and the shift of the DWI to rotate and shift the ADC map correspondingly.

In one embodiment of the present disclosure, the image mask process filters out non-brain tissue (e.g., noise, bones, etc.) from the DWI and the ADC map after the image registration.

As to determine the cerebellum image intensity and the brain image intensity, in one embodiment of the present disclosure, the processor 120 determines the average image intensities of the cerebellum (e.g., the slices before the ninth slice) and the brain (e.g., the slices after the ninth slice). If the average image intensity the cerebellum is too high, the processor 120 will reduce the average image intensity of the cerebellum to be similar to the average image intensity of the brain. For example, the average image intensity of the brain tissue is about 1000, the image intensity of the infarction is about 1500-2000, and the average image intensity of the cerebellum tissue is about 1800; the processor 120 reduces the average image intensity of the cerebellum to be 1000.

As to the nonlinear regression, in one embodiment of the present disclosure, the processor 120 uses the average image intensity of the brain and the average image intensity of each slice to find the nonlinear equation with the optimal threshold, and avoids the problem that the neural network recognizes the higher average image intensity as infarction. The nonlinear regression processes the DWI to generate the third image (i.e., a nonlinear regression image) to filter out normal brain tissue and noise.

As to image cutting, the inputted first, second and third images can be the DWI, the ADC map and the nonlinear regression image through the image mask process. The processor 120 takes a picture every time by moving 8 voxel points, where the size of the picture is 16×16 for example. The processor 120 cuts above three kinds of images at the same position and size, and superimposes the cut images. The position of the current patch, the average intensity of a whole brain image of the DWI, the average intensity of the single slice image of the DWI, and the number of slices are added at the top of the image matrix.

As to the number of samples of the neural network, for example, the number of patients is about 33, and the infarct size of each slice is different, so the number of sheets that can be cut is also different. Because the processor 120 cut each image into small pictures, after the cutting is completed, there are about 1300 infarct images and about 1000 artifact images; except for the infarction and artifacts, the rest parts are non-infarct and can be cut, so that the pictures that can be cut out can even reach tens of thousands. However, when difference of the amounts of respective data of the neural network is too large, the classification of the neural network may be biased to labels of too much data. The non-infarct pictures are more variable than the infarction and artifacts, so that the information required for can be much more than the infarction and artifacts, in which about 8000 non-infarct pictures are needed. The processor 120 select one-tenth of each of infarction, artifact and non-infarction images to be serve as test data and randomly shuffle the order of the test data; the processor 120 uses the rest images as training data and randomly shuffle the order of the training data.

As to the architecture of the neural network, for example, although Max pooling can greatly reduce the calculation speed, it loses tiny features. Because the additional information is added as above when cutting, this embodiment does not use Max pooling so as to improve the precision of the result.

For example, the neural network can have a total of 15 layers, where the second layer is a convolution layer, which uses 4×4 convolution kernels and has 16 random weighted convolution kernels, in which each convolution kernel convolves the original picture to get and gradually normalize 16 feature maps, in which ReLU is used to remove the lower values. The fifth layer is the convolution layer, which uses a 4×4 convolution kernel and has 32 convolution kernels, in which the convolution kernels convolve the results obtained by the previous layer to get 32 feature maps. The eighth layer is the convolution layer, which uses a 4×4 convolution kernel and has 64 convolutions kernels, in which the convolution kernels convolve the results obtained by the previous layer to get 64 feature maps. The eleventh layer can obtain 64 deeper feature maps as above manner, and use the softmax function to find out the possibility of each label, thereby finding the recognition result with the highest probability.

Figure 2:
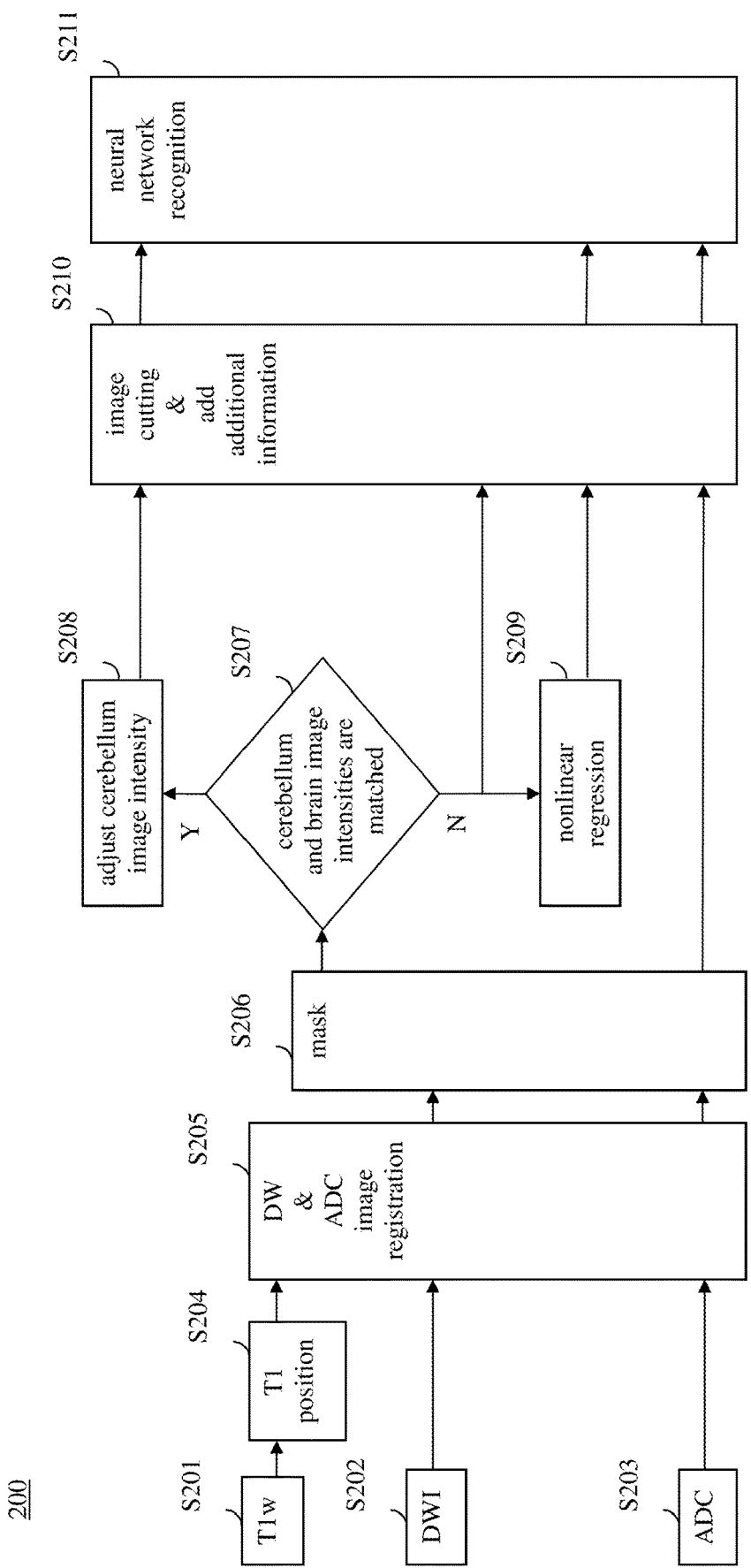
FIG. 2 is a flow chart of an operation method of the automatic brain infarction detection system according to one embodiment of the present disclosure.

For a more complete understanding of an operating method of the automatic brain infarction detection system 100 on MRI, referring FIGS. 1-2, FIG. 2 is a flow chart of the operation method 200 of the automatic brain infarction detection system 100 according to one embodiment of the present disclosure. As shown in FIG. 2, the operation method 200 includes operations S201-S211. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The operation method 200 of the automatic brain infarction detection system 100 includes steps of: receiving a plurality of images corresponding to different slices of a brain of a subject from a MRI machine (operations S201-S205); performing an image mask process on a first image and a second image of the plurality of images (operation S206); determining whether a cerebellum image intensity and a brain image intensity in the first image are matched (operation S207); when the cerebellum image intensity and the brain image intensity are not matched, adjusting the cerebellum image intensity in the first image (operation S208); processing the first image through a nonlinear regression to obtain a third image (operation S209); utilizing a neural network to identify an infarct region by using the first, second and third images that are cut (operations S210-S211).

In one embodiment of the present disclosure, the first image is a DWI, and the second image is an ADC map.

In one embodiment of the present disclosure, the plurality of images further includes T1-weighted image (operation S201). The operation S204 further includes: moving a position of the brain in the T1-weighted image to a center of the T1-weighted image based on an outline of the brain in the T1-weighted image, and then binarizing the T1-weighted image to find a most symmetrical rotation angle of the position of the brain in the T1-weighted image, so as to orientate the T1-weighted image, so that the T1-weighted image is positioned (operation S204).

In one embodiment of the present disclosure, operation S205 further includes: using the T1-weighted image that has been positioned as a basis of image registration for moving and orientating the DWI and the ADC map that have been binarized.

In operation S206, the image mask process filters out non-brain tissue from the DWI and the ADC map after the image registration.

In view of above, technical advantages are generally achieved, by embodiments of the present disclosure. With the technical solution of the present disclosure, the location of the lesion on the MRI can be accurately detected, so that clinicians can efficiently quantify the diagnosis of the MRI in the clinic.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An automatic brain infarction detection system on magnetic resonance imaging (MRI), comprising:
    a memory circuit configured to store at least one instruction; and
    a processor coupled to the memory circuit, and the processor configured to access and execute the at least one instruction for:
        receiving a plurality of images corresponding to different slices of a brain of a subject from a MRI machine;
        performing an image mask process on a first image and a second image of the plurality of images;
        determining whether a cerebellum image intensity and a brain image intensity in the first image are matched;
        adjusting the cerebellum image intensity in the first image when the cerebellum image intensity and the brain image intensity are not matched;
        processing the first image through a nonlinear regression to obtain a third image; and
        utilizing a neural network to identify an infarct region by using the first, second and third images that are cut.

2. The automatic brain infarction detection system on MRI of claim 1, wherein the first image is a diffusion-weighted image (DWI), and the second image is an apparent diffusion coefficient (ADC) map.

3. The automatic brain infarction detection system on MRI of claim 2, wherein the plurality of images further comprises a T1-weighted image, the processor moves a position of the brain in the T1-weighted image to a center of the T1-weighted image based on an outline of the brain in the T1-weighted image, and then binarizes the T1-weighted image to find a most symmetrical rotation angle of the position of the brain in the T1-weighted image, so as to orientate the T1-weighted image, so that the T1-weighted image is positioned.

4. The automatic brain infarction detection system on MRI of claim 3, wherein the processor uses the T1-weighted image that has been positioned as a basis of image registration for moving and orientating the DWI and the ADC map that have been binarized.

5. The automatic brain infarction detection system on MRI of claim 4, wherein the image mask process filters out non-brain tissue from the DWI and the ADC map after the image registration.

6. An operating method of an automatic brain infarction detection system on MRI, and the operating method comprising:
    receiving a plurality of images corresponding to different slices of a brain of a subject from a MRI machine;
    performing an image mask process on a first image and a second image of the plurality of images;
    determining whether a cerebellum image intensity and a brain image intensity in the first image are matched;
    adjusting the cerebellum image intensity in the first image when the cerebellum image intensity and the brain image intensity are not matched;
    processing the first image through a nonlinear regression to obtain a third image; and
    utilizing a neural network to identify an infarct region by using the first, second and third images that are cut.

7. The operating method of claim 6, wherein the first image is a DWI, and the second image is an ADC map.

8. The operating method of claim 7, wherein the plurality of images further comprises a T1-weighted image, and the operating method further comprises:
    moving a position of the brain in the T1-weighted image to a center of the T1-weighted image based on an outline of the brain in the T1-weighted image, and then binarizing the T1-weighted image to find a most symmetrical rotation angle of the position of the brain in the T1-weighted image, so as to orientate the T1-weighted image, so that the T1-weighted image is positioned.

9. The operating method of claim 8, further comprising:
    using the T1-weighted image that has been positioned as a basis of image registration for moving and orientating the DWI and the ADC map that have been binarized.

10. The operating method of claim 9, wherein the image mask process filters out non-brain tissue from the DWI and the ADC map after the image registration.

* * * * *